(12) United States Patent
Gibson

(10) Patent No.: US 7,707,265 B2
(45) Date of Patent: Apr. 27, 2010

(54) SYSTEM, METHOD, AND SERVICE FOR INTERACTIVELY PRESENTING A SUMMARY OF A WEB SITE

(75) Inventor: David Andrew Gibson, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 1537 days.

(21) Appl. No.: 10/847,067

(22) Filed: May 15, 2004

(65) Prior Publication Data
US 2006/0080405 A1 Apr. 13, 2006

(51) Int. Cl.
*G06F 15/16* (2006.01)

(52) U.S. Cl. .................. 709/217; 709/203; 709/246; 707/3; 707/7; 707/10

(58) Field of Classification Search .............. 709/203, 709/217, 219, 246; 707/3, 10, 100, 6, 7
See application file for complete search history.

(56) References Cited

U.S. PATENT DOCUMENTS

| | | | | |
|---|---|---|---|---|
| 6,044,387 | A * | 3/2000 | Angiulo et al. | 715/533 |
| 6,182,097 | B1 * | 1/2001 | Hansen et al. | 715/526 |
| 6,463,455 | B1 * | 10/2002 | Turner et al. | 709/200 |
| 6,865,572 | B2 * | 3/2005 | Boguraev et al. | 707/5 |
| 7,114,124 | B2 * | 9/2006 | Brindle | 715/530 |
| 7,155,489 | B1 * | 12/2006 | Heilbron et al. | 709/217 |
| 2003/0033407 | A1 * | 2/2003 | Low | 709/224 |
| 2003/0120639 | A1 * | 6/2003 | Potok et al. | 707/3 |
| 2003/0229624 | A1 * | 12/2003 | Petrisor et al. | 707/3 |
| 2003/0229854 | A1 * | 12/2003 | Lemay | 715/513 |
| 2004/0059732 | A1 * | 3/2004 | Vaucher | 707/5 |
| 2004/0168132 | A1 * | 8/2004 | Travieso et al. | 715/536 |
| 2004/0225749 | A1 * | 11/2004 | Pavlik et al. | 709/245 |
| 2005/0246410 | A1 * | 11/2005 | Chen et al. | 709/200 |
| 2005/0283537 | A1 * | 12/2005 | Li et al. | 709/240 |
| 2006/0112125 | A1 * | 5/2006 | Potok et al. | 707/101 |
| 2006/0242574 | A1 * | 10/2006 | Richardson et al. | 715/530 |
| 2007/0067317 | A1 * | 3/2007 | Stevenson | 707/100 |

OTHER PUBLICATIONS

PCT International Search Report dated Aug. 18, 2005, for International Application No. PCT/EP2005/052046.

(Continued)

*Primary Examiner*—Oanh Duong
(74) *Attorney, Agent, or Firm*—Samuel A. Kassatly; Fleit, Gibbons, Gutman, Bongini & Bianco P.L

(57) ABSTRACT

An interactive web site summary system builds an overview browsing system for the entire Web. Overview browsing represents an alternative to the search-based view of information work by providing a consistent set of summary views that can be browsed interactively. The views presented by the present system partition and linearize a corpus for ready understanding and exploration. These views show features of a web site such as, for example, the relation of a web site to other web sites, the broad nature of the information contained in the web site, how the web site is structured, how the web site has changed over time. The interactive web site summary system maintains such summary information in a process that is fast enough to be updated daily.

31 Claims, 13 Drawing Sheets

OTHER PUBLICATIONS

Yongzheng Zhang et al., "World Wide Web Site Summarization" Web Intelligence And Agent Systems 2004: An International Journal, vol. 2, No. 1, pp. 39-53, Aug. 28, 2003.

Mani, I, "Recent Developments in Text Summarization" Proceedings of the 2001 CIKM '01, International Conference On Information, 2001. pp. 529-531.

Candan, K. S. et al., "Discovering Web Document Associations for Web Site Summarization," Third International Conference, Proceedings (Lecture Notes in Computer Science vol. 2114) Springer-Verlag Berlin, Germany, 2001, pp. 152-161.

Carchiolo, V., "Extraction of Hidden Semantics from Web Pages," Intelligent Data Engineering and Automated Learning—Ideal 2002. Third International Conference (Lecture Notes In Computer Science vol. 2412) Springer-Verlag Berlin, Germany, 2002, pp. 117-122.

Craven, T. C. "Html Tags As Extraction Cues For Web Page Description Construction" Informing Science Informing Science Institute USA, vol. 6, No. 1, 2003, pp. 1-12.

Milic-Frayling, N., et al. "MIDAS: 1-12 Towards Rich Site Stricture and Content Metadata" 2003, retrieved from the Internet at the following address: "http://www2003.org/cdrom/papers/poster/p237/p237-milicfrayling.htm," on Jul. 20, 2005.

* cited by examiner

800

| Site Summary | |
|---|---|
| Site Name | www.weblogjournal.com |
| Site Size | 2570 pages in store |
| Languages | English (95.3%) French (2.2%) Catalan (1.2%) (more) |
| Page Size | Average 605 words    10-90    1000-10000+  912 |
| | Average 9218 bytes   100-900  10000-100000+ 897 |
| Duplicate Analysis | 1500 pages (58.4%) are duplicates |
| | Largest duplicate counts: 664 232 181 162 84 68 57 8 7 7 |
| Media Files | |
| Last Modified Dates | |

| | | | | | | | | |
|---|---|---|---|---|---|---|---|---|
| 2001 1 | J1 | A0 | S0 | | | | | |
| 2002 126 | J0 | F67 | M24 | A0 | M0 | J3 | J0 | A4 S2 O9 N17 D0 |
| 2003 13 | J0 | F12 | M1 | | | | | |

Crawl Dates

| | | | | | | | | |
|---|---|---|---|---|---|---|---|---|
| 2002 423 | J79 | F0 | M0 | A36 | M0 | J0 | N21 | D284 |
| 2003 3082 | J0 | F483 | M999 | A0 | M43 | J0 | J0 | A27 S0 O0 N170 D66 |
| 2004 64 | J84 | F0 | M0 | | | | | |

Robots  Blocked to all robots: directory.bml/
Last verified: Wed Jan 28 17:36:25 2004 View

| Directory Structure |
|---| www.blogjournal.com (2570)
    ...redirects... (17)
    ...errors... (1)
    code (1)
   ⊟ community (13)
        elfwood (1)
        gothic_watch (1)
        libraries (1)
        openphoto (4)
    developer (1)
    download (4)
    friends (5)
    invite (1)
    legal (3)
    misc (1)
    news (1)
    paidaccounts (1)
    poll (7)
    portal (1)
    site (4)
   ⊞ styles (1)
    support (5)
    syn (1)
    todo (2)
    tools (8)
    topics (2)
   ⊞ users (1700)
    view (16)
    ~bair (1)
    ~bumperfish (2)
    ~flashman (1)
    ~jwz (1)

| Site | Site Name | Links | Pages in Store |
|---|---|---|---|
| | Links to Other Sites | | |
| 1 | quizilla.com | 194 | 435 |
| 2 | www.john-book.com | 88 | 352 |
| 3 | devon.trigmafall.com | 72 | 429 |
| 4 | Alestar.trigmafall.com | 72 | 80 |
| 5 | www.diaryland.com | 71 | 90 |
| 6 | sm4.sitemeter.com | 71 | 774 |
| 7 | cgi.ebay.com | 49 | 1 |
| 8 | www.fcc.univap.br | 45 | 232 |
| 9 | www.amazon.com | 37 | 7739 |
| 10 | www.geocities.com | 36 | 21190 |
| 11 | www.cnn.com | 33 | 153925 |
| 12 | openphoto.net | 32 | 984 |
| 13 | www.nytimes.com | 25 | 14330 |
| 14 | www.hiredgoons.ca | 25 | 1095 |
| 15 | www.imbd.com | 22 | 4851 |
| 16 | www.quizdiva.com | 22 | 469 |
| 17 | us.imbd.com | 22 | 1520 |
| 18 | www.bonkthud.com | 22 | 199 |
| 19 | www.icq.com | 18 | 1252 |
| 20 | itsawrap.done.nu | 18 | 1100 |

Top Keywords List

| 1... | Pages | 21... | Pages | 41... | Pages | 61... | Pages | 81... | Pages |
|---|---|---|---|---|---|---|---|---|---|
| s, | 946 | version | 850 | Jay | 601 | technical | 302 | clicking | 298 |
| image | 928 | download | 841 | Michigan | 597 | nemiroff | 301 | credit | 297 |
| service | 925 | resolution | 818 | Discover | 592 | index | 301 | bright | 297 |
| appy | 925 | highest | 810 | Calendar | 591 | education | 301 | known | 238 |
| nights | 923 | Astronomy | 639 | Credit | 585 | tech | 300 | gas | 238 |
| editors | 923 | Robert | 638 | See | 552 | glossary | 300 | center | 228 |
| picture | 908 | Picture | 632 | Clicking | 544 | bonnell | 300 | dark | 215 |
| universe | 901 | Jerry | 632 | light | 434 | authors | 300 | color | 208 |
| photograph | 901 | Day | 632 | years | 418 | usra | 299 | sky | 205 |
| different | 901 | Bonnell | 632 | see | 373 | robert | 299 | planet | 204 |
| day | 901 | APOD | 630 | visible | 337 | rep | 299 | left | 203 |
| written | 896 | Archive | 626 | star | 332 | norris | 299 | surface | 195 |
| astronomer | 894 | USRA | 625 | stars | 323 | nasa | 299 | right | 194 |
| professional | 893 | Glossary | 624 | astronomy | 317 | mtu | 299 | blue | 194 |
| explanation | 893 | Authors | 624 | search | 310 | michigan | 299 | dust | 193 |
| brief | 893 | Specific | 623 | specific | 307 | lhea | 299 | space | 192 |
| fascinating | 892 | Rep | 623 | tomorrow | 304 | jerry | 299 | Sun | 192 |
| cosmos | 891 | GSFC | 623 | calendar | 304 | jay | 299 | Copyright | 192 |
| featured | 883 | Search | 620 | archive | 304 | gsfc | 299 | large | 189 |
| available | 854 | Index | 619 | discover | 303 | apod | 299 | red | 187 |

FIG. 11

SYSTEM, METHOD, AND SERVICE FOR INTERACTIVELY PRESENTING A SUMMARY OF A WEB SITE

FIELD OF THE INVENTION

The present invention generally relates to browsing interfaces for the World Wide Web. More particularly, the present invention relates to an interactive browsing interface that provides a summary overview of collections of web pages such as web sites for the entire web. In specific, the present system provides an overview interface that shows features of a web site such as topics, dates, links, structure, etc. aggregated across the web site.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these web pages by means of computer software programs commonly known as Internet browsers. Due to the vast number of WWW web sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata within the body of the document that defines the web pages. This document is typically written in, for example, hypertext markup language (HTML). A computer software product known as a web crawler systematically accesses web pages by sequentially following hypertext links (hyperlinks) from web page to web page. The crawler indexes the web pages for use by the search engines using information about a web page as provided by its address or Universal Resource Locator (URL), metadata, and other criteria found within the web page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the search terms, and returns the search of results in the form of web pages in, for example, HTML. Each search result comprises a list of individual entries that have been identified by the search engine as satisfying the search expression. Each entry or "hit" comprises a hyperlink that points to a Uniform Resource Locator (URL) location or web page.

As new information access technologies became available, the nature of information work has changed. Search engines have transformed most Web tasks into reference tasks: the current expectation is that tasks begin with a search query and end with a suitable result web page. This mode of operation is simple, but it is being overwhelmed with the volume of web pages competing for attention. Ranked results lists have difficulty in scaling to the size of the current Web.

Previous systems that provide summaries of web sites fall into two classes: broad and narrow-coverage. Alexa®, a subsidiary of Amazon®, exemplifies the broad coverage approach. Alexa® monitors browsing traffic and computes a "Traffic Rank" for all web sites. Alexa® also displays information about ownership from the "whois" database and user reviews. Alexa® further displays in an unstructured list web sites linking to a summarized web site. Although this technology has proven to be useful, it would be desirable to present additional improvements. To avoid the computational expense, Alexa® makes no attempt to summarize the contents or structures within a web site.

A variety of Web monitoring tools exist that address narrow coverage of web site summarization. These web-monitoring tools are primarily concerned with detecting changes in a web site. As an example, ChangeDetector®, applies machine-learning techniques to detect subtle changes in web sites. Clustering is used to visualize comparisons between web sites [reference is made to L. Y. Bing Liu, et. al, "Visualizing web site comparisons", In *Proceedings of the 11th International World Wide Web Conference (WWW 2002)*, web pages 693-703, 2002.] Although this technology has proven to be useful, it would be desirable to present additional improvements. Typically, Web monitoring tools monitor only a specific and targeted set of web sites (or URLs) rather than all web sites crawled on the WWW.

What is needed is a method for providing as much useful information as possible for a web site, while keeping the data volumes and processing requirements feasible. WebTOC illustrates what richness can be added to the directory structure display, by displaying not only web page counts but breakdowns by types of media files and file sizes reference is made to D. Nation, et. al., "Visualizing web sites using a hierarchical table of contents browser: WebTOC", In *Designing for the Web: Practices and Reflections*, 1997. Mappucino is another web site mapping tool that can display topic-customized maps, using graph layout algorithms [reference is made to Y. Maarek, et. al, "A system for dynamic and tailorable web site mapping", In *Proceedings of the 6th International World Wide Web Conference*, 1997].

The Relation Browser provides an interactive table of contents for a web site reference is made to G. Marchionini, et. al, "Toward a general relation browser: A GUI for information architects", In *Journal of Digital Information*, volume 4, 2003. The Relation Browser allows a user to "slice" the available content on a web site by various topic categories and displays the number of matching documents of various types for the specified topic. Although this technology has proven to be useful, it would be desirable to present additional improvements. These systems only crawl web sites on an as-needed basis and do not allow users to browse interactively from web site to web site.

Web site summaries have previously been provided on a web site-by-web site basis to track changes on web sites or to view specialized information. Large-scale summarization has been provided only for web traffic summaries. No method currently exists for providing a rapid overview or summary of a web site or collection of web pages that allows a user to browse interactively from web site to web site. What is therefore needed is a system, a service, a computer program product, and an associated method for interactively presenting a summary of a web site. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for interactively presenting a summary of a web site. The present system builds an overview browsing system for the entire Web. Overview browsing represents an alternative to the search-based view of information work by providing a consistent set of summary views that can be browsed interactively. The views presented by the present system partition and linearize a corpus for ready understanding and exploration. These views show features of a web site such as, for example, the relation of a web site to other web sites, the broad nature of the information contained in the web site, how the web site is structured, how the web site has changed over time. The present system maintains such summary information in a process that is fast enough to be updated daily.

In much the same way as search engines, the present system improves the usefulness of the web not by improving the interface but by enabling access to new information. While a search engine is able to find a good web site about a favorite hobby, it cannot tell how extensive or well maintained the web site is nor how the web site relates and compares to other hobbyist web sites. These are issues that involve aggregating information from across all the web pages on the web site, and they are usually left to manual exploration. Automating this process completely is dependent on particular needs of a user. The present system provides assistance for user objectives such as, for example, navigation, discovery, and assessment.

The present system aids in web navigation. While many web sites provide web site maps and navigation aids, these web site maps and navigational aids are most often limited or altogether missing. The present system builds alternative navigation structures with a consistent interface.

The present system aids in discovery of information. Many information retrieval researchers seek to recapture the serendipity effect of physical libraries. The present system allows viewing of a particular web site in an overview format. The overview format naturally exploits the selectivity of the web site author; the topical coherence of a web site implies that related documents are likely to be "nearby".

The present system aids in assessment of web sites. By gathering information about the web site that contains a particular web page, users can better form judgments about freshness, authorship, audience, reliability, and scope.

The present system provides concise summaries of web page collections that can be used to partition and linearize information in a web site and expose the information to a browsing interface through overview browsing. By way of definition, overview browsing is able to partition, linearize, impose consistency, and browse interactively.

The present system partitions information through faceted browsing [reference is made to K. P. Yee, et. al., "Faceted metadata for image search and browsing". In *Proceedings of the conference on Human factors in computing systems*, web pages 401-408. ACM Press, 2003]. Web pages under consideration in a web site have facets such as, for example, creation dates, languages, or media types. The present system summarizes the web site or collection of web pages by counting the occurrences of each facet. Counting the facets provides immediately useful information (e.g., "This web site is 50% English, 50% French"). The present system thus offers an option for exploration, for example, by restricting to one language or by performing a methodical comparison of the two sub-collections. In data-mining terminology, the present system allows users to "drill" into sub-collections. The present system utilizes partitioning based on many different facets for flexibility in analyzing web sites. In some domains, for example, date information is not as important as hyperlinks.

The present system linearizes a view of the web site by providing automatically-created exploration sequences that can be used to explore the full range of possibilities in some domain. Linearized exploration progresses along a single dimension, allowing a user to view or sample from a comprehensive range of values without the risk of missing items by ad-hoc browsing. For example, the present system can break out the web pages on a web site by date so that the user can view web pages in time progression.

The present system imposes consistency. It is an advantage to users to have a consistent interface for overview information. Many web sites already provide some form of web site map, local search tool, or other overview. However, these web sites are not in the majority, and even those that do have web site maps face problems in keeping them up to date. Furthermore, many web sites do not even provide web pages that are easy to navigate. Thus, the present system provides consistency by providing the same interface to overview and navigation support on all web sites.

The present system allows users to browse interactively. Many features of the present system have been provided in offline systems where overviews are not available in real time. Interactive browsing of the present system captures the essential nature of hypertext as a dynamic medium, cued to the decisions of the user. The present system presents a web site overview graphically and intuitively, enabling users to quickly understand an overview.

The present system provides overview browsing for any collection of web pages as the unit of aggregation. In one embodiment, the present system provides overview browsing for a web site; a web site is defined as all the web pages on a particular host. Since hostnames are owned by a particular individual or institution, the web pages on a web site typically share commonality in content, origins, and motivations. Consequently, the present system allows users to view the Web on a web site-wide level of aggregation and make judgments about web sites as a whole.

Browsing by web site takes advantage of "spatial locality" in a manner similar to physical libraries. Many information retrieval and digital library researchers seek to recapture the serendipity effect of libraries [reference is made to M. Hearst, "User interfaces and visualization", In R. Baeza-Yates and B. Ribeiro-Neto (Eds.) *Modern information retrieval*. NY: ACM Press., 1999]. It is useful to visit the physical library shelves because carefully selected and related works are likely to be near each other. Viewing a particular web site at a time very naturally exploits the selectivity of the web site author; the topical coherence of a web site means that related documents are likely to be "nearby". The present system provides means for locating these nearby documents by utilizing aggregation by web site. In another embodiment, the present system handles more general collections such as, for example, collections of web sites or single directories on a web site.

The present system utilizes as platform any system that can provide large volumes of current web page data. In one embodiment, the present system is built on the WebFountain® platform or large scale text analytics [reference is made to S. Dill, et. al., "Seeker: An architecture for web-scale text analytics". Technical Report RJ 10233 (95107), IBM Research, February 2002 f and S. Dill, et. al., "Semtag and seeker: Bootstrapping the semantic web via automated semantic annotation", In *Proc* 12th *International WWW Conf*, Budapest, Hungary, May 2003]. Since many useful statistics can be rapidly computed, the present system pre-computes web site summaries for the entire Web. Typical summaries calculated by the present system comprise measures of size, web page attributes, date ranges, directory structure, link structure, topics, etc.

To determine measures of size, the present system aggregates the total number of web pages, words, and bytes on a web site. Word count indicates the amount of textual content. Byte count shows the quantity of non-textual content, such as scripting and layout code, that is present on the web site.

To determine web page attributes, the present system maintains simple counters for many features of web pages such as, for example, the language detected on the web page, the HTTP return code, and the presence of links to media files such as .mpg and .wav. Aggregated across a web site, web page attributes yield insights into the nature of the web site.

To determine date ranges, the present system utilizes dates provided by the web crawler. The web crawler reports the date of the last web page fetch and the last-modified date of the web page, as returned by the web server. The present system accumulates these dates into histograms, bucketed by day. Consequently, the present system shows how recent the crawl of the web pages on the web site occurred and how often web pages on the web site are updated.

To determine directory structure, the present system examines the URLs of the web pages on the web site. Each URL comprises a path into the logical directory tree of web pages on the web site. By assembling all URLs on the web site, the present system reconstructs the logical directory structure, giving a very useful overview of the web site contents.

To determine link structure, the present system shows links from web pages on a web site by hostname. Accumulating all links from web pages on a web site generates a large volume of data that is difficult to display usefully. Consequently, the present system records only the hostname in each link. This allows the present system to show which other web sites are referenced and with what frequency. In one embodiment, the present system further shows which web sites link to the web site being overviewed.

To discern topics, the present system tracks all words appearing on the web site. The present system accumulates topics across web pages to show which topics occur on the most web pages.

The present system is general-purpose tool useful to professionals engaged in such fields as business competitive intelligence, current events analysis, or other research tasks, as well as to the general public browsing for news, goods, or entertainment.

The present system utilizes a general-purpose architecture that allows easy integration of additional features. In one embodiment, the current system provides more metadata in the summaries such as, for example, geographic information, textual parsing to extract meaningful phrases and proper names, etc.

Because of the goal of summarizing very large collections of web pages in real time, the present system does not use a conventional posting-list-based index. An index-based approach typically begins by retrieving a list of all web page identifiers for a web site or other collection from the index. Using these identifiers, the index-based approach then needs to fetch enough web page content to build the summary on-line. In this case, the search time is dominated not by the posting list retrieval but by the fetching of all the additional information needed to produce the summary [reference is made to T. Haveliwala, "Efficient encodings for document ranking vectors", In *International Conference on Internet Computing,* 2003]. Consequently, posting lists need to contain considerable additional information to avoid many disk seeks to get a results web page.

In contrast, the present system pre-computes and stores the summary directly instead of using a postings list. This summary becomes an intermediate stage in the process of finding web pages for the user. The present system can then provide much richer summary information than is provided by an on-line summarizer. In this way, the present system even reduces the volume of data that an index-based approach accesses since the summary can be smaller than the postings list.

In the field of information retrieval, attention has been focused on analyzing the interplay between directory structure and linkage structure. To improve information retrieval, techniques have been proposed for "untangling" web sites to find which collections of web pages should be treated as single documents [reference is made to N. Eiron, et. al., "Untangling compound documents on the web", In *Proceedings of ACM Hypertext* '03, 2003]. The present system can be used for operations such as this, resulting in much more accurate summaries of how many actual documents are present on a web site.

The per-web site connectivity patterns form an identifiable signature that can be used to classify and cluster web sites with some degree of accuracy [reference is made to E. Amitay, et. al., "The connectivity sonar: detecting web site functionality by structural patterns", In *Proceedings of ACM Hypertext* '03, web pages 38-47. ACM Press, 2003]. The present system can display this signature as summary metadata. In one embodiment, the present system can tailor the overview based on the signature. Consequently, while overviews remain globally consistent, the present system emphasizes more commerce-relevant information for web sites that appear commercial, etc.

The present system can be used to extend the notion of web site documents in the other direction, to sub-web pages. A key problem with information retrieval on the Web is the amount of non-content information on web pages, including advertising and navigational text. Web site aggregation can be used to identify this text [reference is made to Z. Bar-Yossef et. al., "Template detection via data mining and its applications", In *Proceedings of the* 11*th International World Wide Web Conference,* 2002]. The present system is suitable for the integration of these template detection algorithms, benefiting both retrieval and summarization accuracy.

The present system may be embodied in a utility program such as an interactive web site summary utility program. The present system provides means for the user to identify a collection of web pages, a directory, or an index for which the present system performs interactive web site summarization and presentation. The present system further provides means for the user to specify a query for which a web site is retrieved and summarized. The user selects the input data, specifies a query, and then invokes the interactive web site summary utility program to present an interactive summary of a web site or collection of web pages.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 8 is an exemplary web site summary view created by the interactive web site summary system of FIGS. 1 and 2;

FIG. 9 is an exemplary directory structure view created by the interactive web site summary system of FIGS. 1 and 2;

FIG. 10 is an exemplary link summary view created by the interactive web site summary system of FIGS. 1 and 2; and FIG. 11 is an exemplary keyword summary view created by the interactive web site summary system of FIGS. 1 and 2.

DETAILED DESCRIPTION OF PREFERRED EMBODIMENTS

The following definitions and explanations provide background information pertaining to the technical field of the present invention, and are intended to facilitate the understanding of the present invention without limiting its scope:

Facet: a feature in a web site or collection of web pages that can be summarized. Facets comprise language, geographical location, date ranges, web page attributes, directory structure, topic frequency, link structure, measures of size, etc.

Interactive: providing results to a user in a time scale that allows interaction of the user with the results; a typical interactive time scale is less than eight seconds.

Internet: A collection of interconnected public and private computer networks that are linked together with routers by a set of standards protocols to form a global, distributed network.

Link: A pointer in a web page or in a document such as an HTML document that leads to another web page or to another place within the same document; also called a hyperlink.

URL (Uniform Resource Locator): A unique address that fully specifies the location of a content object on the Internet. The general format of a URL is protocol://server-address/path/filename, where the server-address is also referred to as the host name.

World Wide Web (WWW, also Web): An Internet client-server hypertext distributed information retrieval system.

Figure 1:
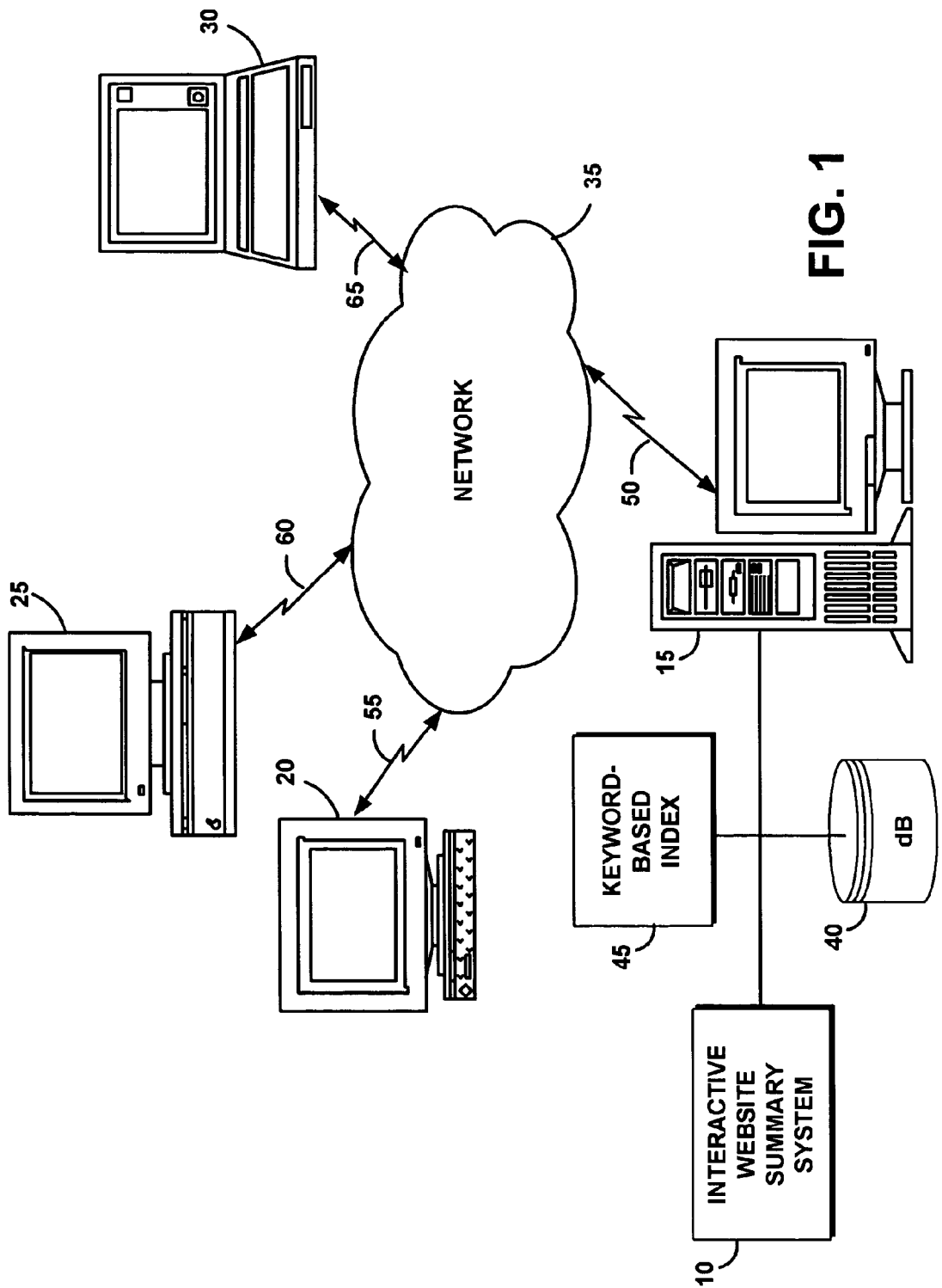
FIG. 1 is a schematic illustration of an exemplary operating environment in which an interactive web site summary system of the present invention can be used.

FIG. 1 portrays an exemplary overall environment in which a system and associated method (the "system 10") for interactively presenting a summary of a web site according to the present invention may be used. System 10 comprises a software programming code or a computer program product that is typically embedded within, or installed on a host server 15. Host server 15 may also be a cluster of multiple host servers. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 summarizes web pages obtained by a crawler operated on host server 15. The web pages are accessed by system 10 from a page store 40, a central repository of web pages. These web pages may be stored in the form of a database or other hierarchical structure. In another embodiment, users provide a database or other hierarchical structure to system 10; system 10 then presents an interactive summary of the database or other hierarchical structure for the user. System 10 further utilizes a keyword-based index 45.

Computers 20, 25, 30 each comprise software that allows the user to interface securely with the host server 15. The host server 15 is connected to network 35 via a communications link 50 such as a telephone, cable, or satellite link. Computers 20, 25, 30, can be connected to network 35 via communications links 55, 60, 65, respectively. While system 10 is described in terms of network 35, computers 20, 25, 30 may also access system 10 locally rather than remotely. Computers 20, 25, 30 may access system 10 either manually, or automatically through the use of an application.

Figure 2:
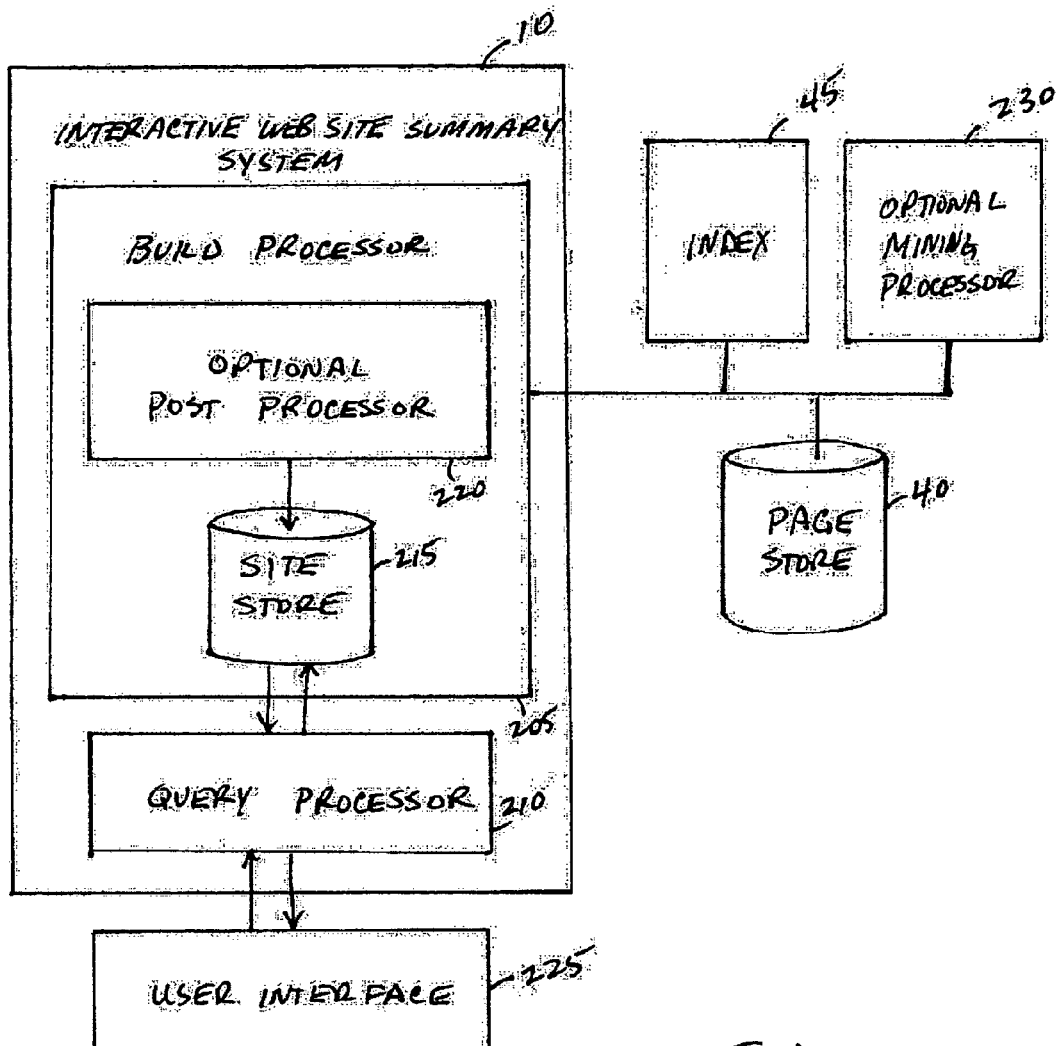
FIG. 2 is a block diagram of the high-level architecture of the interactive web site summary system of FIG. 1.

FIG. 2 illustrates a high-level hierarchy of system 10. System 10 comprises a build processor 205 and a query processor 210. The build processor 205 pre-computes summary information about web pages stored in the page store 40. This summary information is stored in a site store 215. An optional post processor 220 performs additional computations on the summary information on a web site basis after summary information has been pre-computed for each web site. The query processor 210 comprises a query engine that accesses the site store 215. A user queries system 10 by providing a keyword or web site to the query processor 210 by means of a user interface 225. The query processor 210 then returns responses in the form of summary web pages to the user by means of the user interface 225.

An optional mining processor 230 further analyzes the web pages on the page store 40 and extracts information. The mining processor 230, for example, breaks text on the web pages into phrases to determine topics on the web page, determines the language in which a web page is written, determines the date the web page was created or updated, determines outlinks on the web page, etc.

The fundamental unit of processing for the build processor 205 is a summary record. The summary record summarizes the information contained in any number of web pages, from a single web page to an entire web site. The build processor 205 uses these summary records and aggregates the summary records into web site-level summaries. Information in the summary record comprises tags and counts. For example, there are particular tags for web page, word, and byte counts, and there are tags for all keywords, dates (treated at the granularity of days), and directory names present on the web site. Merging two summary records comprises adding the counts for each tag. For directory structure, the directory names are maintained in a tree data structure that is optimized for rapid merging.

All the operations performed by system 10 are streaming operations over parallel streams, which avoids random disk seeks. In one embodiment all data is stored compressed on disk to reduce storage requirements and improve disk read time.

Figure 3:
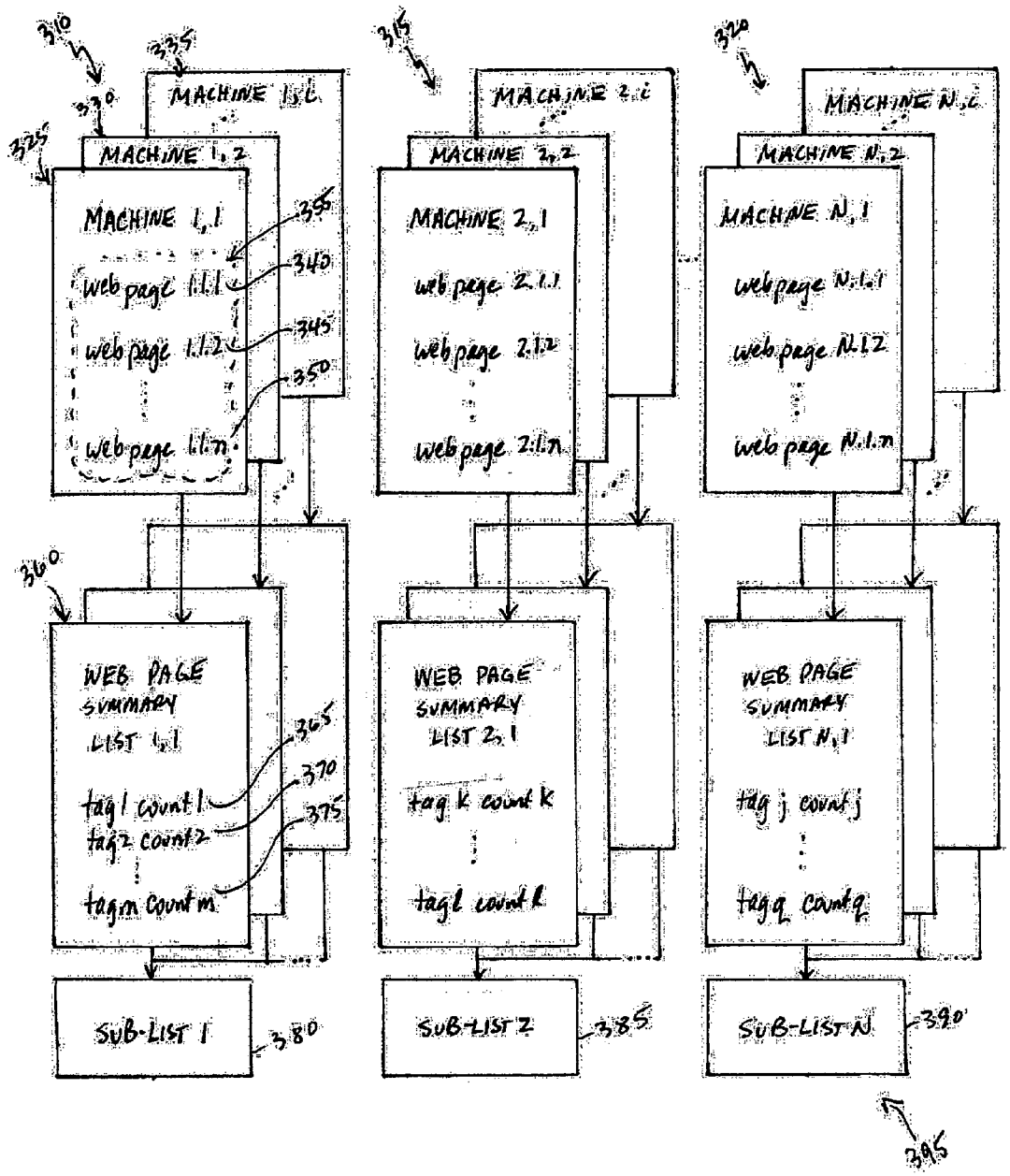
FIG. 3 is a schematic illustration portraying an operation of the interactive web site summary system of FIGS. 1 and 2 in creating a merged web page summary list.

FIG. 3 illustrates the process of merging the tags and counts for web pages into a set of merged web page summary lists 395. The page store 40 comprises a cluster of machines in parallel. These machines each store a number of web pages. The web pages associated with a web site may be stored on several machines. System 10 merges the information from all the machines in the cluster into one set of merged web page summary lists 395 with the summaries for each web site co-located in the set of merged web page summary lists 395.

System 10 numbers the machines in the data store 40 from 1 to i, such as, for example, machine 1, 325, machine 2, 330, through machine i, 335. Each machine produces N "site groups" of pages, numbered from 1 to N. Thus, for example, we have machine 1 containing site group 1, 325, machine 2 containing site group 1, 330, machine i containing site group 1, 335, machine i containing site group 2, 315, and machine i containing site group N, 320. Each machine comprises data for web pages such as web page 1.1.1, 340, web page 1.1.2, 345, through web page 1.1.n, 350, (collectively referenced as web pages 1.1, 355) residing on site group 1 contained on machine 1, 325.

System 10 extracts information from each web page to form a list of tag and count pairs for each machine, as illustrated by a web page summary list 1,1, 360, created from web pages 1.1, 355. The web page summary list 1,1, 360 comprises tags and counts such as, for example, tag 1 count 1, 365, tag 2 count 2, 370, through tag m count m 375. Each web page such as web page 1.1.1, 340, comprises one or more tags and counts. System 10 sorts each list such as web page summary list 1,1, 360 with respect to the URL for each web page associated with the tags and counts.

System 10 merges the lists extracted for each group on each machine into a sub-list such as sub-list 1, 380, sub-list 2, 385, through sub-list N, 390, collectively reference as sub-lists 395. Each of the web page summary lists such as web page summary list 1,1, 360 are sorted. Consequently, summaries for each web site are co-located in the merged web page summary lists 380, 385, to 390. System 10 processes these merged web page summary lists 395 and stores them in the site store 215. The process used by system 10 achieves daily turnaround speed by minimizing disk access to three reads and two writes per web page.

Figure 4A:
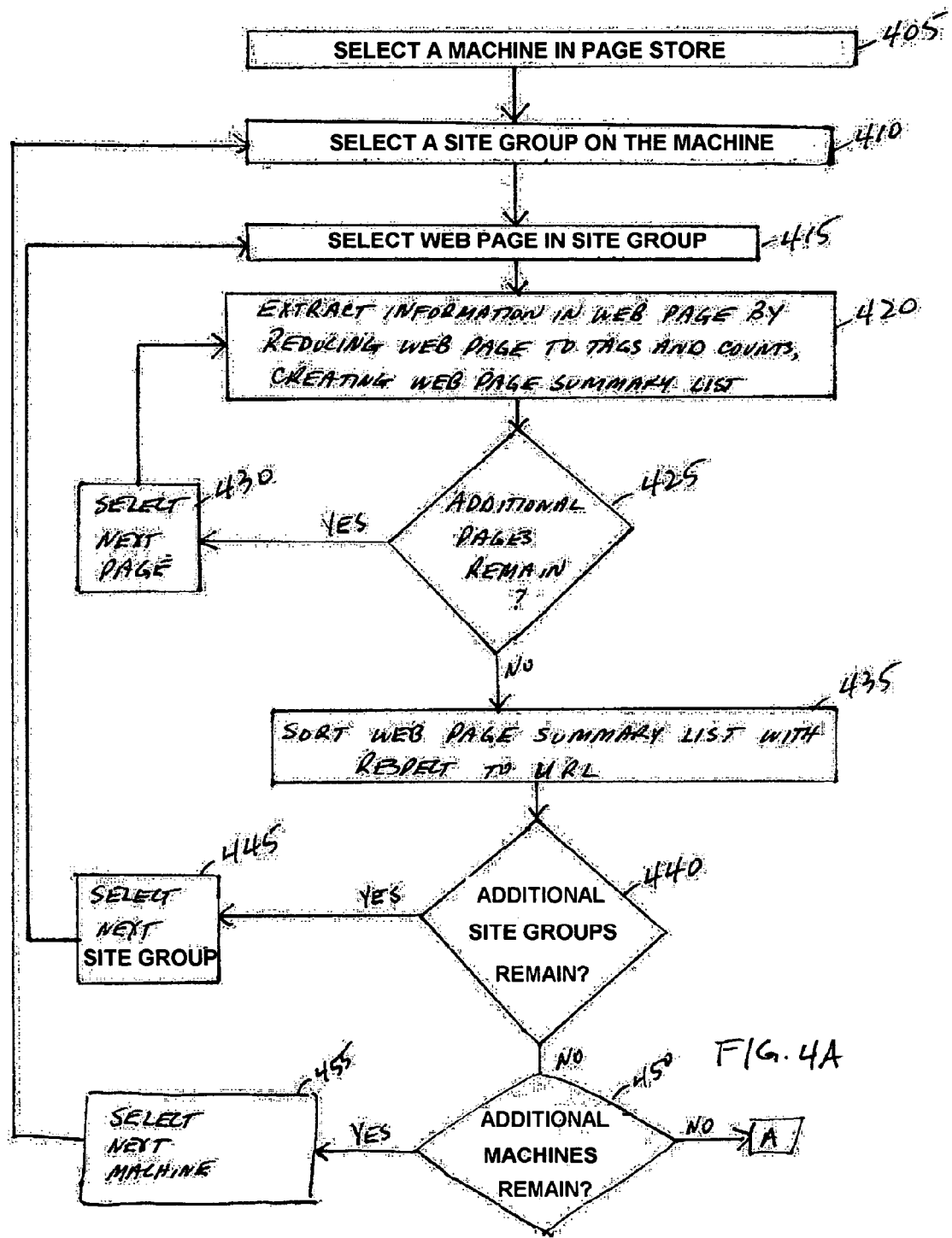
FIG. 4 is comprised of FIGS. 4A and 4B and represents a process flow chart illustrating a method of operation of the interactive web site summary system of FIGS. 1 and 2 in creating the web page summary list.
Figure 4B:
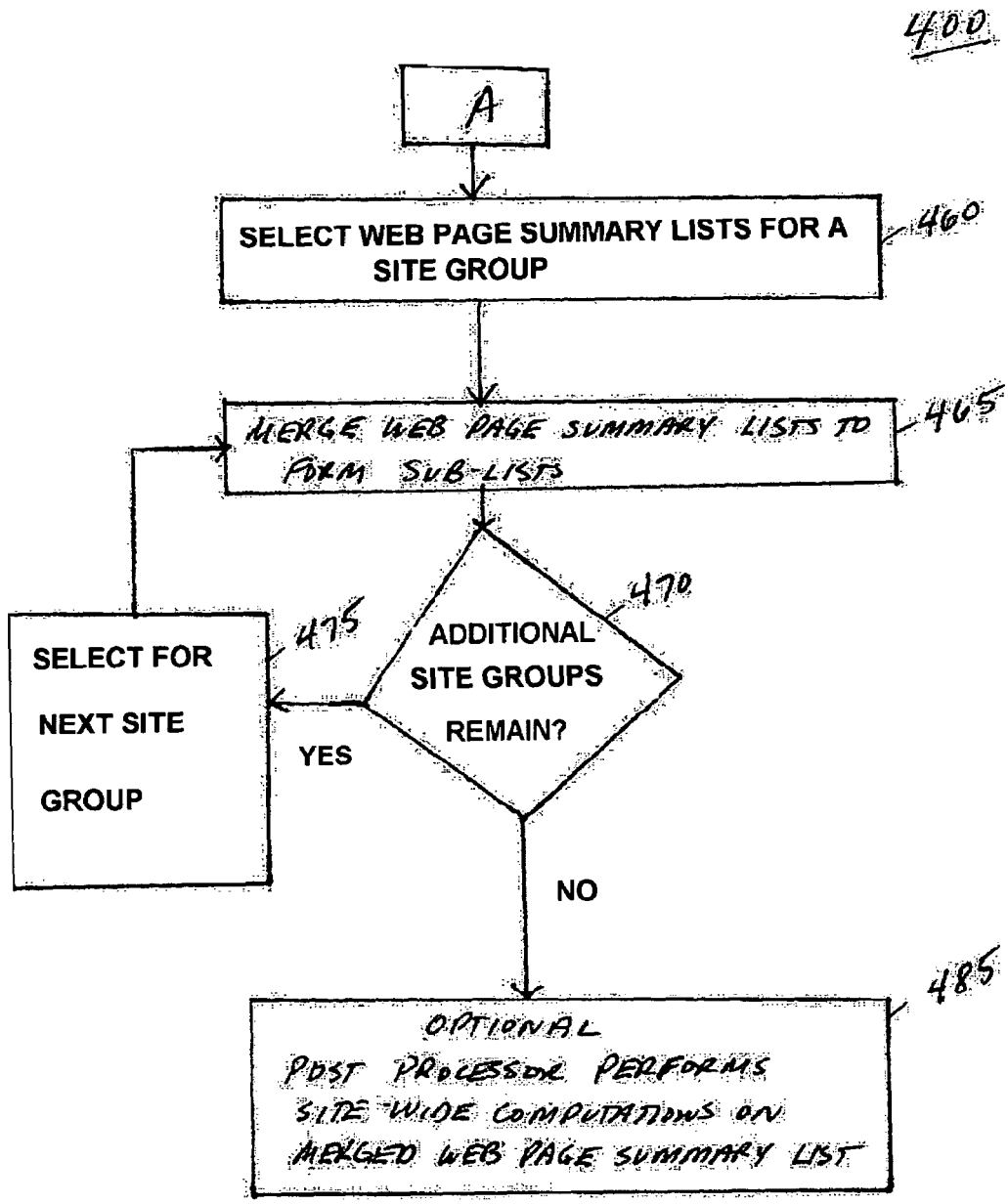

FIG. 4 (FIGS. 4A, 4B) illustrates a method 400 of creating the merged web page summary lists 395. System 10 selects a machine in page store 40 (step 405) and a site group on the machine (step 410). System 10 selects a web page for summarizing in the selected machine (step 415). System 10 extracts information in the selected web page by reducing the information in the web page to tag and count pairs, creating a web page summary list (step 420).

System 10 determines whether additional web pages remain for extraction (decision step 425). If addition web pages remain, system 10 selects the next web page (step 430) and returns to step 420. If all web pages in the selected site group have been processed, system 10 sorts the web page summary list with respect to the URL associated with each tag and count pair. System 10 determines whether additional groups remain for processing on the machine (decision step 440). If additional groups remain for processing, system 10 selects the next groups on the machine (step 445) and returns to step 415, repeating steps 415 through 440 until all groups on the machine have been processed.

System 10 determines whether additional machines remain for processing (decision step 450). If additional machines remain for processing, system 10 selects the next machine (step 455) and returns to step 410, repeating steps 410 through 450 until all machines have been processed.

System 10 selects the web page summary lists for a site group (step 460, FIG. 4B). System 10 merges the web page summary lists to form a sub-list (step 465). System 10 determines whether additional site groups remain with web page summary lists that have not been processed (decision step 470). If so, system 10 selects the web page summary lists for the next site group (step 475) and returns to step 465. Once the web page summary lists for all the site groups have been processed, in an optional step (step 485), the optional post processor 220 performs web site wide computations on the merged web page summary lists 395 such as averaging counts, etc.

Having created the merged web page summary lists 395, system 10 updates the merged web page summary lists 395 as the crawler discovers new or updated web pages. Creating the merged web page summary list 395 is a lengthy process; updating the merged web page summary list 395 allows a user interactive access to current web site information with a minimum of processing.

Figure 5:
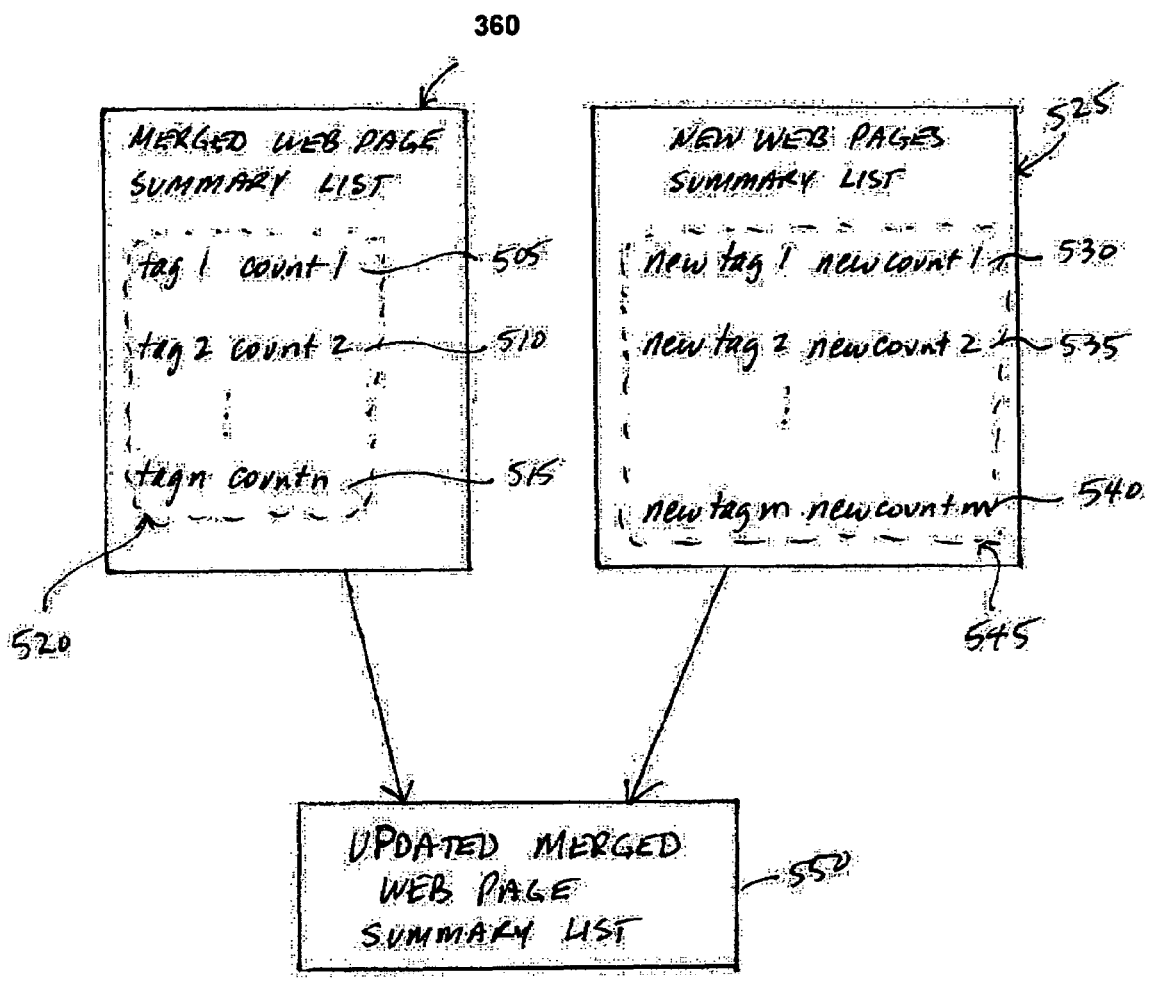
FIG. 5 is a schematic illustration portraying an operation of the interactive web site summary system of FIGS. 1 and 2 in updating the web page summary list.

FIG. 5 is a schematic illustration portraying an operation of system 10 in updating the merged web page summary lists 395. It illustrates the case of a particular list such as list 360. The merged web page summary list 360 comprises a list of tag count pairs such as tag 1 count 1, 505, tag 2 count 2 510, through tag n count n 515, collectively referenced as tag count pairs 520. Each of the tag count pairs 520 has associated with it the URL of the web page from which it was extracted. A new web page summary list 525 is extracted by system 10 from new web pages. The new web page summary list comprises new tag new count pairs such as new tag 1 new count 1, 530, new tag 2 new count 2, 535, through new tag m new count m, 540, collectively referenced as new tag count pairs 540. Each of the new tag count pairs 540 has associated with it the URL of the web page from which it was extracted.

System 10 compares the new tag count pairs 540 with the tag count pairs 520. If a web page is new, system 10 inserts the associated new tag count pairs 540 into the merged web page summary list 540. If a web page is updated, system 10 replaces the tag count pairs 520 associated with the old web page with the new tag count pairs 540 for the updated web page. In this manner, system 10 creates an updated merged web page summary list 550.

Figure 6A:
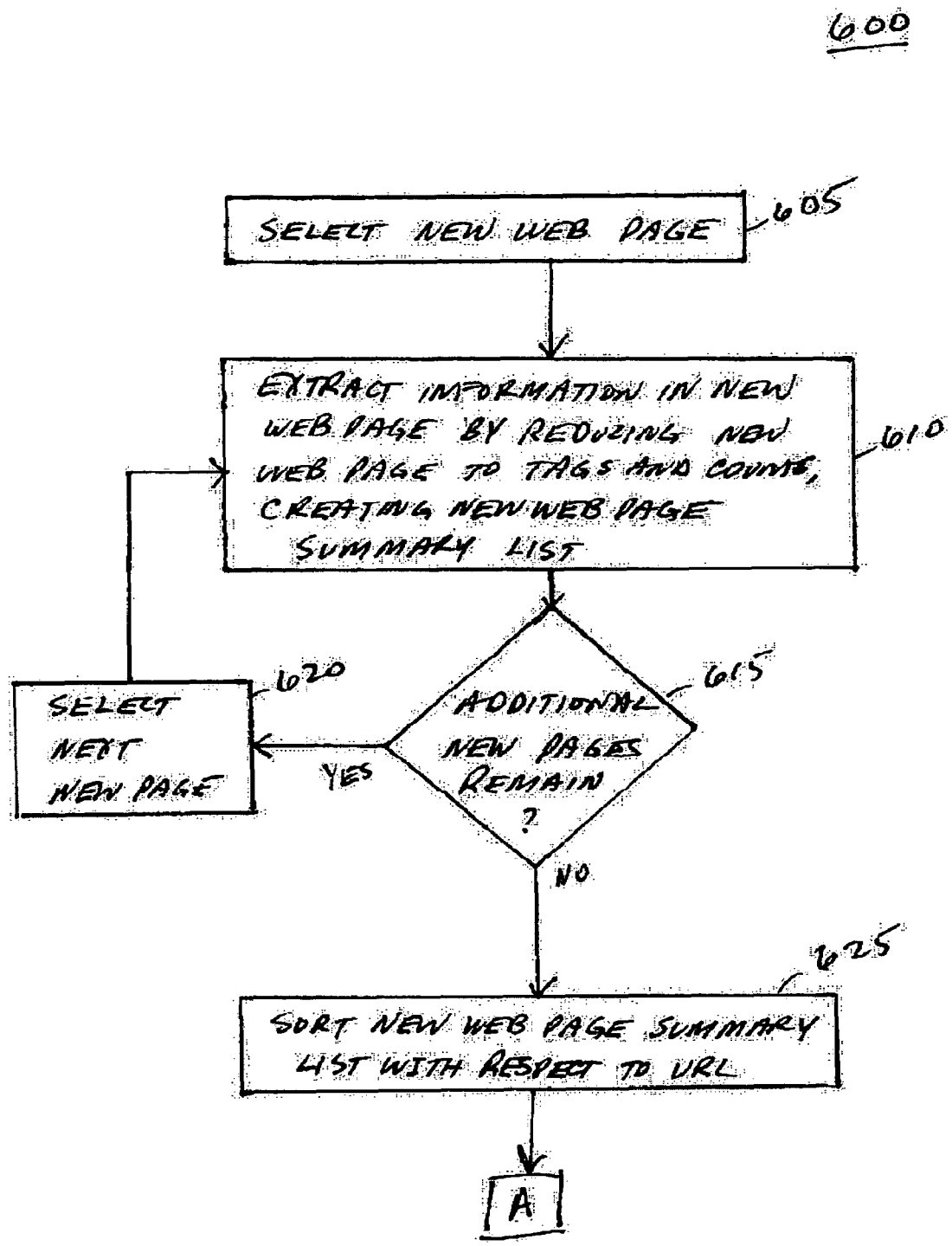
FIG. 6 is comprised of FIGS. 6A and 6B and represents a process flow chart illustrating a method of operation of the interactive web site summary system of FIGS. 1 and 2 in updating the web page summary list.
Figure 6B:
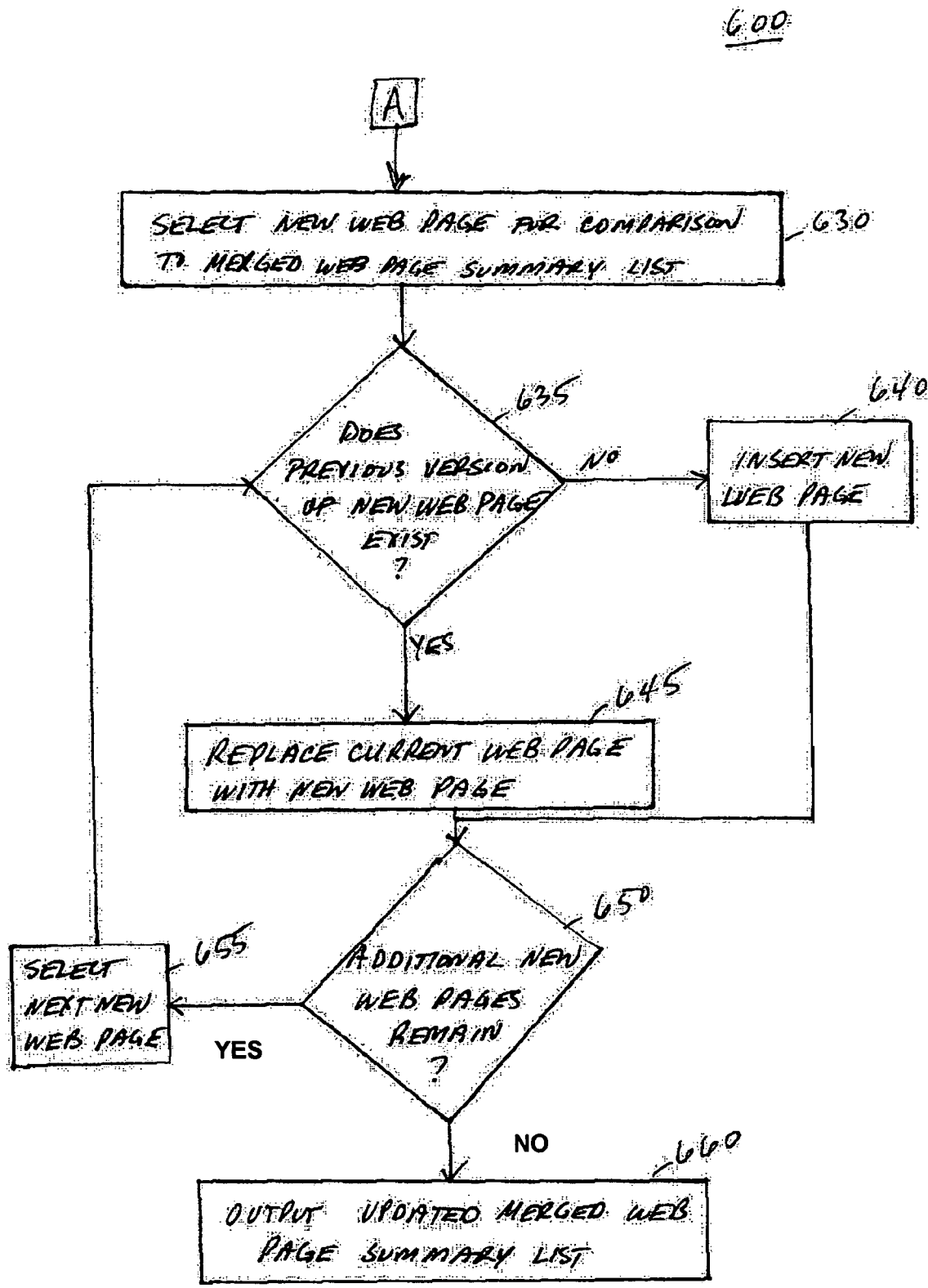

FIG. 6 (FIGS. 6A, 6B) illustrates a method 600 of system 10 in updating a web page summary list such as 360. System 10 selects a new web page (step 605) from a set of new web pages found by a crawler. System 10 extracts information in the new web page by reducing the new web page to tags and counts, creating the new web page summary list 525 (step 610). System 10 determines whether additional new web pages remain for processing (decision step 615). If additional new web pages require processing, system 10 selects the next new web page (step 620) and returns to step 610.

If no additional new web pages remain for processing, system 10 sorts the new web page summary list 525 with respect to the URL of the new web pages (step 625). System 10 selects a new web page in the new web page summary list 525 for comparison with the merged web page summary list 360 (step 630). System 10 determines whether the new web page in the new web page summary list 525 exists in the merged web page summary list 360 (decision step 635). If the new web page does not exist in the merged web page summary list 360, system 10 inserts the tag count pairs for the new web page into the merged web page summary list 360 in a position that maintains the sort of the merged web page summary list 360 with respect to the URL of the web pages (step 640). If the new web page exists in the merged web page summary list 360, the new web page is an update. System 10 then replaces the tag count pairs of the current web page in the merged web page summary list 360 with the tag count pairs of new web page (step 645).

System 10 determines whether additional new web pages remain for processing in the new web page summary list (step 650). If additional new web pages remain for processing, system 10 selects the next new web page (step 655) and returns to decision step 635. Otherwise, system 10 outputs the updated merged web page summary list 550, which replaces the old summary list 360 for future merges into sub-list 380 in the process described in FIG. 4A. The process of FIG. 6 is repeated for all summary lists from all site groups and all machines.

Figure 7:
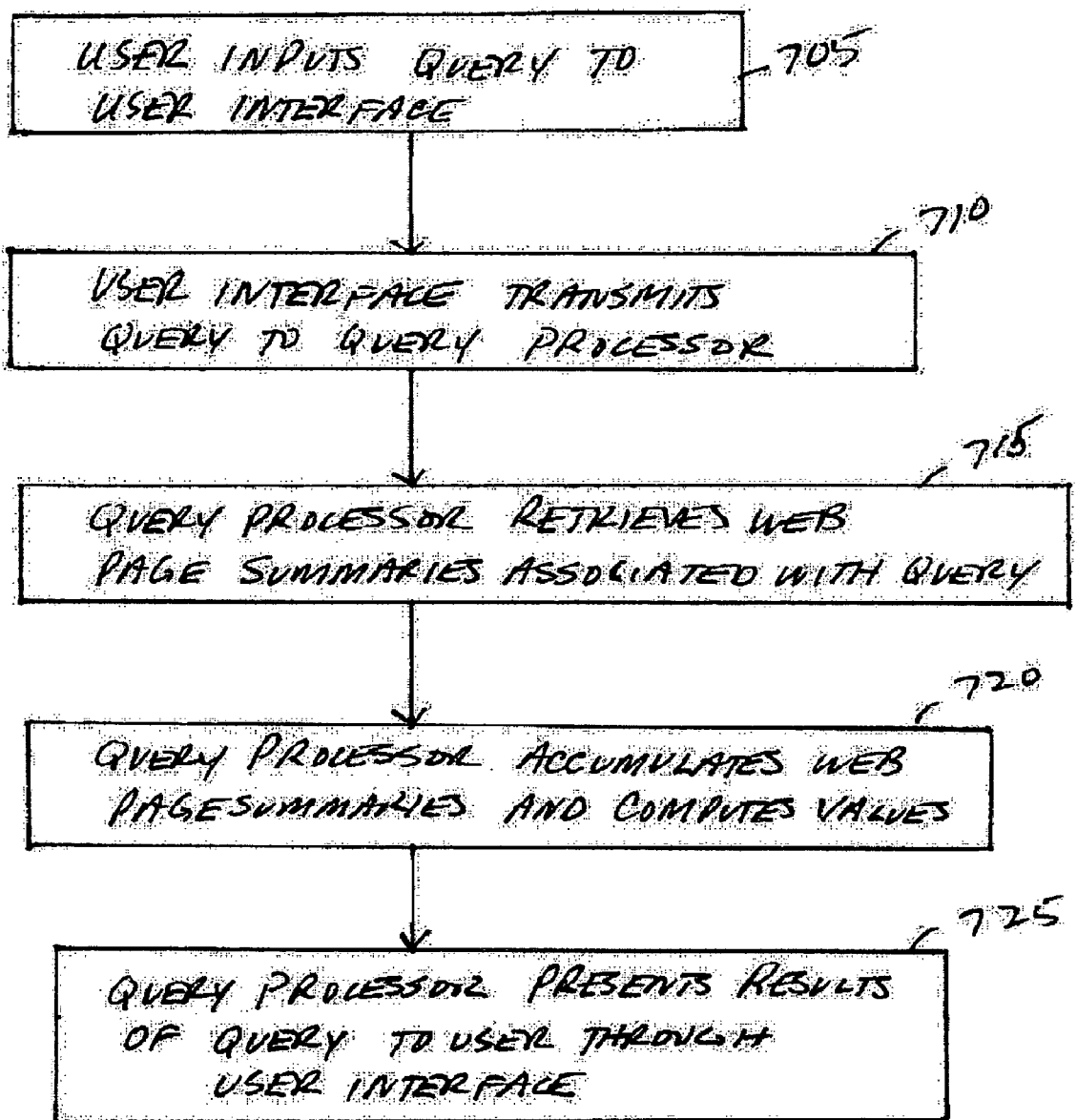
FIG. 7 is a process flow chart illustrating a method of operation of the interactive web site summary system of FIGS. 1 and 2 in responding to a query from a user.

FIG. 7 illustrates a method 700 of system 10 in responding to a user query. A user inputs a query to the user interface 225 (step 705). The user interface 225 transmits the query to the query processor 210 (step 710). The query processor 210 retrieves web page summaries associated with the query from the site store 215 (step 715). The query processor 210 accumulates the retrieved web page summaries and computes values such as totals, etc. (step 720). The query processor 210 presents the results of the query to the user through the user interface 225 (step 725).

The output of the query processor comprises a web site summary view, a directory structure view, a link summary view, and a keyword summary view. In one embodiment, the query processor comprises a top topics view. FIG. 8 illustrates an exemplary web site summary view 800. The web site summary view 800 shows basic web site size information, giving web page counts and distributions of web page sizes, as well as information about languages present and media files found. Additionally, it shows the ranges of dates present, for the web pages that were crawled. All these statistics are clickable, for example to show the web pages containing the given language. The site summary view 900 is useful for determining how extensive the crawler coverage has been on the web site.

FIG. 9 illustrates an exemplary directory structure view 900. The directory structure view 900 is a simple tree viewer, with subdirectories that expand and collapse. The directory structure view 900 shows the number of web pages found in each subdirectory. Clicking on a directory shows the web pages present in the directory.

FIG. 10 illustrates an exemplary link summary view 1000. The link summary view 1000 displays a list of web sites referenced, ranked by the number of links found to each web site. As an indication of the importance of the referenced web sites, the link summary view 1000 shows the number of web pages found on the referenced web site. Clicking on the web site navigates to a "link summary view" for that web site. Consequently, the user can browse continuously through the web site network. The user can then return to the web site summary view 900 or other views for the web site.

FIG. 11 illustrates an exemplary keyword summary view 1100. The keyword summary view 1100 shows a list of keywords, ranked by the number of web pages on the web site on which the keyword occurs. Common words are excluded to improve the usefulness of the display. The user can interactively investigate by clicking through to a list of web pages matching the keyword. In one embodiment, system 10 provides a topic summary view similar to the keyword summary view 1100.

The output views of system 10 translate into simple retrieval operations on the site store 215. Recent operations are cached to further improve performance. In one embodiment, the response time for the current system averages 1.4 seconds per web page view, with a median response time of 0.13 seconds. The complementary views and techniques of system 10 accelerate the browsing process, giving better access to information.

It is to be understood that the specific embodiments of the invention that have been described are merely illustrative of certain applications of the principle of the present invention. Numerous modifications may be made to the system and method for interactively presenting a summary of a web site described herein without departing from the spirit and scope of the present invention. Moreover, while the present invention is described for illustration purpose only in relation to the WWW, it should be clear that the invention is applicable as well to, for example, intranets and subsets of the WWW in addition to data derived from any source stored in any format that is accessible by the present invention. Further, while the present invention is described for illustration purpose only in relation to summaries of web sites, it should be clear that the invention is applicable as well to, for example, collections of web pages or other documents.

What is claimed is:

1. A method of interactively presenting summaries of collections of pages, comprising:
    extracting summary data from a plurality of pages, wherein the summary data includes at least textual data and non-textual data extracted from each page in the plurality of pages wherein the extracted summary data also includes language statistics of one or more languages present in the plurality of pages;
    storing the extracted summary data for interactive access; and
    in response to a search query, displaying a summary of the plurality of pages, wherein the summary is generated based on the extracted summary data, and wherein the summary which has been displayed comprises the language statistics of the plurality of pages.

2. The method of claim 1, further comprising
    sorting the summary data;
    merging t least a portion of the sorted summary data into a plurality of merged summary lists; and
    wherein the displaying further comprises:
        retrieving at least the summary in response to the search query from the merged summary lists.

3. The method of claim 2, wherein retrieving at least the summary comprises retrieving summary data associated with a collection of web pages.

4. The method of claim 2, wherein sorting the summary data comprises sorting the summary data with respect to a uniform resource locator associated with the summary data.

5. The method of claim 2, wherein merging the sorted summary data comprises combining the summary data to maintain a sorting order.

6. The method of claim 2, wherein merging the summary data comprises updating the merged sorted summary data with a new web page summary list.

7. The method of claim 6, further comprising extracting information from a new web page by reducing the new web page to a plurality of pairs of new tags and new counts.

8. The method of claim 7, further comprising sorting the new web summary list with respect to a uniform resource locator associated with at least some of the pairs of new tags and new counts.

9. The method of claim 8, further comprising inserting at least some of the pairs of new tags and new counts into the merged sorted summary data if the new web page does not exist in the merged sorted summary data.

10. The method of claim 1, wherein the summary data comprises a plurality of pairs of tags and counts, wherein at least one pair of tags and counts is associated with textual data and at least one other pair of tags and counts is associated with non-textual data.

11. A system for interactively presenting summaries of collections of pages, comprising:
    a mining processor for extracting summary data from a plurality of pages on a plurality of machines, wherein the summary data includes at least textual data and non-textual data extracted from each page in the plurality of pages, and wherein the extracted summary data also includes language statistics of one or more languages present in the plurality of pages;

a store for storing the extracted summary data for interactive access; and a query processor for displaying, in response to a search query, a summary of the plurality of pages, wherein the summary is generated based on the extracted summary data, and wherein the summary which has been displayed comprises the language statistics of the plurality of pages.

12. The system of claim 11, wherein the query processor retrieves summary data associated with a web site.

13. The system of claim 11, wherein the query processor retrieves summary data associated with a collection of web pages.

14. The system of claim 11, further comprising a build processor, wherein the build processor:

sorts the summary data; and merges the sorted summary data from at least some of the machines into a plurality of merged summary lists.

15. The system of claim 14, wherein the build processor at least one of:

merges by combining the summary data to maintain a sorting; and sorts the summary data with respect to a uniform resource locator associated with the summary data.

16. The system of claim 14, wherein the build processor updates the merged sorted summary data with a new web page summary list.

17. The system of claim 16, wherein the mining processor further extracts information from a new web page by reducing the new web page to a plurality of pairs of new tags and new counts, and wherein the build processor further sorts the new web summary list with respect to a uniform resource locator associated with at least some of the pairs of new tags and new counts.

18. The system of claim 17, wherein the mining processor inserts at least some of the pairs of new tags and new counts into the merged sorted summary data if the new web page does not exist in the merged sorted summary data.

19. The system of claim 11, wherein the summary data comprises a plurality of pairs of tags and counts, wherein at least one pair of tags and counts is associated with textual data and at least one other pair of tags and counts is associated with non-textual data.

20. The system of claim 1, wherein the mining processor further extracts information from a new web page by reducing the new web page to a plurality of pairs of new tags and new counts.

21. A computer readable storage medium having a plurality of executable instruction codes for interactively presenting summaries of collections of pages, comprising:

a first set of instruction codes for extracting summary data from a plurality of pages, wherein the summary data includes at least textual data and non-textual data extracted from each page in the plurality of pages wherein the extracted summary data also includes language statistics of one or more languages present in the plurality of pages;

a second set of instruction codes for storing extracted summary data for interactive access; and a third set of instruction codes for displaying, in response to a search query, a summary of the plurality of pages, wherein the summary is generated based on the extracted summary data, and wherein the summary which has been displayed comprises the language statistics of the plurality of pages.

22. The computer readable storage medium of claim 21, further comprising:

a fourth set of instruction codes for sorting the summary data;

a fifth set of instruction codes for merging at least a portion of the sorted summary data from at least some of the machines into a plurality of merged summary lists; and sixth set of instruction codes for retrieving at least the summary in response to the search query from the merged summary lists.

23. The computer readable storage medium of claim 22, wherein the sixth set of instruction codes retrieves at least the summary by retrieving summary data associated with a collection of web pages.

24. The computer readable storage medium of claim 22, wherein the fourth set of instruction codes sorts the summary data by sorting the summary data with respect to a uniform resource locator associated with the summary data.

25. The computer readable storage medium of claim 22, wherein the fifth set of instruction codes merges the sorted summary data by combining the summary data to maintain a sorting order.

26. The computer readable storage medium of claim 22, wherein the fifth set of instruction codes merges the summary data by updating the merged sorted summary data with a new web page summary list.

27. The computer readable storage medium of claim 26, further comprising a seventh set of instruction codes for extracting information from a new web page by reducing the new web page to a plurality of pairs of new tags and new counts.

28. The computer readable storage medium of claim 27, wherein the seventh set of instruction codes sorts the new web summary list with respect to a uniform resource locator associated with at least some of the pairs of new tags and new counts.

29. The computer readable storage medium of claim 28, wherein the seventh set of instruction codes inserts at least some of the pairs of new tags and new counts into the merged sorted summary data if the new web page does not exist in the merged sorted summary data.

30. The computer readable storage medium of claim 21, wherein the summary data comprises a plurality of pairs of tags and counts, wherein at least one pair of tags and counts is associated with textual data and at least one other pair of tags and counts is associated with non-textual data.

31. A computer-implemented method for interactively presenting summaries of collections of documents, comprising:

extracting summary data from a collection of documents a, wherein, the summary data includes at least textual data and non-textual data extracted from each document in the collection of documents, and the extracted summary data also includes language statistics of one or more languages present in the collection of documents;

sorting the summary data;

merging at least a portion of the sorted summary data into a plurality of merged summary lists storing the extracted summary data for interactive access; and retrieving summaries associated with a search query from the merged summary lists, generating a summary of the collection of documents based on the retrieved summaries, wherein the summary includes at least a count of the extracted textual data, a count of the extracted non-textual data, and the language statistics of the collection of documents; and displaying the summary to a user through a user interface.

* * * * *